(12) United States Patent
Crawford et al.

(10) Patent No.: US 7,302,269 B1
(45) Date of Patent: Nov. 27, 2007

(54) RADIOLOCATION IN A WIRELESS NETWORK USING TIME DIFFERENCE OF ARRIVAL

(75) Inventors: Jason R. Crawford, McMahons Point (AU); John D. O'Sullivan, Hunters Hill (AU); Brian Hart, Wollstoneeraft (AU)

(73) Assignee: Cisco Technology, Inc., San Jose, CA (US)

( * ) Notice: Subject to any disclaimer, the term of this patent is extended or adjusted under 35 U.S.C. 154(b) by 623 days.

(21) Appl. No.: 10/803,367

(22) Filed: Mar. 18, 2004

(51) Int. Cl.
*H04Q 7/20* (2006.01)

(52) U.S. Cl. ............... 455/456.1; 455/456.6; 455/13.2

(58) Field of Classification Search ............ 455/456.1, 455/422.1, 13.2, 456.6; 370/341
See application file for complete search history.

(56) References Cited

U.S. PATENT DOCUMENTS

| | | | |
|---|---|---|---|
| 4,486,850 A | 12/1984 | Hyatt | 364/747 |
| 5,565,764 A | 10/1996 | Priebe et al. | 324/76.21 |
| 5,920,278 A | 7/1999 | Tyler et al. | 342/33 |
| 7,030,812 B2 * | 4/2006 | Bekritsky et al. | 342/387 |
| 7,184,464 B2 | 2/2007 | Abraham et al. | 375/150 |
| 7,190,712 B2 | 3/2007 | Abraham et al. | 375/150 |

FOREIGN PATENT DOCUMENTS

| | | | |
|---|---|---|---|
| WO | WO 02/058267 A2 | 7/2002 |
| WO | WO 02/058290 A1 | 7/2002 |
| WO | WO 02/058346 A2 | 7/2002 |
| WO | WO 03/100348 A1 | 12/2003 |
| WO | WO 03/107188 A1 | 12/2003 |

OTHER PUBLICATIONS

Tim Cornwell and Alan Bridle. "Deconvolution Tutorial." The National Radio Astronomy Observatory (Charlottesville, Virginia). Nov. 4, 1996. The tutorial is widely distributed, and available online at http://www.cv.nra.edu/~abridle/deconvol/deconvol.html.

(Continued)

*Primary Examiner*—Temica Beamer
(74) *Attorney, Agent, or Firm*—Dov Rosenfeld; Inventek (57) ABSTRACT

A method and an apparatus for radiolocation using time differences of arrival. The method includes receiving transmit timestamps from a set of wireless stations of a wireless network. Each station transmits at least once. The transmit timestamp uses a local timestamping clock to indicate when a station transmitted a packet. The method further includes receiving sets of timestamped captured samples from each station that receives one of the transmitted packets. The times of arrival of each packet at each station are determined from the received sets of timestamped captured samples, and, the relative positions of the stations are determined from the determined times of arrival and the received transmit timestamps. The transmitting by the stations is in a round robin manner one station after the other, and several round robins may be used to mutually calibrate local clocks. Also an apparatus for inclusion in a station of a wireless network. The apparatus includes a buffer subsystem and a timestamping subsystem, such that the station can capture and timestamp a set of samples of a received signal, and send the captured timestamped samples to a processing entity for time difference of arrival location determination.

34 Claims, 5 Drawing Sheets

OTHER PUBLICATIONS

Eric Weisstein. "CLEAN Algorithm—from Eric Weisstein's World of Physics." Downloaded on Feb. 14, 2004. Available online at http://scienceworld.wolfram.com/physics/CLEANAlgorithm.html.

"Observing with the MuSiCoS spectropolarimeter: On-line data reduction with ESpRIT." Laboratoire d'Astrophysique de Toulouse (Toulouse France). Downloaded Apr. 22, 2004 and available online at http://webast.ast.obs-mip.fr/magnetisme/pol/esprit.html.

Jean-Francois Donati. "Least-Squares Deconvolution of Stellar Spectra." Laboratoire d'Astrophysique de Toulouse (Toulouse France). Downloaded Apr.. 22, 2004 and available online at http://webcast.ast.obs-mip.fr/people/donati/multi.html.

J. -F. Donati, M. Semel, B.D. Carter, D.E. Rees, and A.C. Cameron. "Spectropolarimetric Observations of Active Stars." Royal Astronomical Society, Monthly Notices, vol. 291, p. 658, Nov. 1997. Available online at http://webast.ast.obs-mip.fr/people/donati/pub/lsd.html.

"AeroScout WLAN Location System." Downloaded on Nov. 10, 2003 and available online at http://www.blusoft-inc.com/wlan.asp, Bluesoft, Inc., San Mateo, CA.

"Cognio Announces Breakthrough Location Techonology for WLAN Deployments." Downloaded on Nov. 10, 2003 and available online at http://www.cognio.com/pressdetail.asp?itemID=70. Cognio, Inc., Waltham, MA.

"WhereNet Main Page." Downloaded Nov. 10, 2003 and available online from http://www.wherenet.com/ WhereNet, Santa Clara, CA.

\* cited by examiner

RADIOLOCATION IN A WIRELESS NETWORK USING TIME DIFFERENCE OF ARRIVAL

BACKGROUND

The present invention is related to wireless networks, and in particular to determining the location of wireless stations in a wireless network.

Use of wireless networks such as wireless local area networks (WLANs) is becoming widespread. Locating radios in a wireless communication system, such as a WLAN, enables new and enhanced features, such as location-based services and location-aware management. Location-based services include, for example, assigning the correct closest printer to a wireless station of a WLAN.

A WLAN may be ad hoc, in that any station may communicate directly with any other station, or have an infrastructure in which a station (called a "client station" or simply a "client") can only communicate via an access point (AP)—a station that acts as a base station for a set of clients. The access point is typically coupled to other networks that may be wired or wireless, e.g., to the Internet or to an intranet. That wider network is called the "wired" network herein, and it is to be understood that this wired network may be an internetwork that includes other wireless networks.

WLAN management applications of radiolocation include the location of client stations and the location of rogue access points. See for example, U.S. patent application Ser. No. 10/766,174 filed Jan. 28, 2004 and titled "A METHOD, APPARATUS, AND SOFTWARE PRODUCT FOR DETECTING ROGUE ACCESS POINTS IN A WIRELESS NETWORK" to inventors Olson, et al., for more details of the latter application and how radiolocation may be used to aid rogue access point detection.

A number of techniques have been proposed for radiolocation. Prior art methods are known that rely on the Global Positioning System (GPS). GPS, however, is known to have poor indoor reception and long acquisition time. GPS also requires additional GPS hardware in the wireless station that would increase the cost of stations, e.g., client devices.

Methods based on signal strength also are known. Many such methods, however, require a signal strength map of the area of interest, obtained, for example, by taking time-consuming signal strength measurements at numerous locations in the area of interest. Methods that use RF modeling to determine the signal strength map also are known. The modeling, however, requires detailed input of a building layout, wall location, and construction materials. Some methods also depend on a model of loss of signal strength in the area of interest. In general, while such signal strength methods may work well, particularly if there is a relatively large number of closely spaced access points from which the signal strength measurements can be obtained, there is still a need in the art for alternate or complimentary methods to carry out radiolocation.

Radiolocation methods are known that rely on time difference of arrival (TDOA) estimation. One advantage of TDOA methods is that no prior information is needed on the region of interest. All that are needed are a common clock reference and connections that are line of sight—or near line of sight.

Thus there is an incentive to use TDOA methods for radiolocation.

The speed of electromagnetic radiation (light) is about 1 ft/ns. Therefore, TDOA methods require fine time accuracy. Furthermore, radio hardware that is used in modern WLANs includes sampling a signal at a sampling rate that is typically in the order of 40, 80 MHz or perhaps even 120 MHz, so that the best possible resolution based on individual samples, is ±12.5, ±6.25, ±4.2 ns (in time) or feet (in distance) for the 40, 80, and 120 MHz sampling rates. However, typical IEEE 802.11b, 802.11a and 802.11 g signals have a signal bandwidth that is less than or equal to 20 MHz, so that 1/bandwidth is greater than or equal to 50 ns. This in itself is not sufficient to achieve resolution of, say 5 to 10 ft.

Thus there is a need to perform TDOA with finer resolution than is provided based on the timing of an individual sample and based on bandwidth. To do better requires processing a sequence of samples of received data, each of which is associated with a local clock value, e.g., processing a sequence of timestamped received signal samples. Such processing in turn requires a capture of a sequence of received signal samples and the ability to post-process such samples.

There therefore is a need in the art for a method and apparatus that captures, timestamps and distributes as necessary a plurality of samples received in a radio receiver for TDOA location determining.

Local clocks in wireless devices, e.g., clocks that can be used for timestamping the data samples, have some level of drift and other inaccuracies. Such clocks are typically generated using crystals. A crystal that is inherently sufficiently accurate to carry out synchronization useful for TDOA estimation may be prohibitively expensive. Furthermore, any form of independent clock requires at least time offset calibration no matter how accurate. Any free running clock will have an unknown clock offset unless a relative measurement is performed. The quality of the crystal will influence how often such calibration needs to be carried out.

One mechanism that would avoid needing mutual calibration would be some form of physical or wired clock distribution with equal length cables or some mechanism to eliminate clock offsets.

Thus there is a need in the art for a method of TDOA determination using local clocks that are relatively inaccurate, e.g., that drift over time without requiring a mechanism for central clock distribution.

SUMMARY

Disclosed herein is a method, apparatus, and software product for radiolocation using measurements at wireless stations of a wireless network.

A variant for radiolocating a potential rogue uses signals received at one or more client stations. The client stations are first located using the radiolocation method.

Described herein are a method and an apparatus for radiolocation using time differences of arrival. One embodiment of the method includes receiving sets of timestamped captured samples, one set from each wireless station of a wireless network that receives a packet transmitted from another wireless station of the wireless network. The timestamping uses a local timestamping clock to indicate when a station receives a packet. The transmitting by the stations is in a round robin manner, one station after the other. The times of arrival of each packet at each station are determined from the received sets of timestamped captured samples, and, the relative positions of the stations are determined from the determined times of arrival. Several round robins may be used to mutually calibrate local clocks of the wireless stations.

One embodiment of the method further includes receiving transmit timestamps from the wireless stations that transmit.

Each station transmits at least once, and timestamps the transmit using the local timestamping clock to indicate when the station transmits a packet. The received transmit timestamps from each transmitting station are also used to determine the relative positions of the stations.

Another embodiment does not include sending transmit timestamps. Knowledge of the relative separation of the stations and of how to relate the stations' local clocks allows the necessity for a transmit time stamp to be removed.

In one embodiment, determining the times of arrival of each packet includes, for each set of captured samples, correlating the captured samples with a reference signal to obtain a correlated result. The reference signal corresponds to at least part of the signal that was transmitted. One aspect of the invention is deconvolving the correlated result, and determining the location of the first peak of the results of the deconvolving as an indication of the time of arrival.

Another aspect is an apparatus for inclusion in a wireless station. The apparatus includes a buffer subsystem and a timestamping subsystem, such that the station can capture and timestamp a set of samples of a received signal, and send the timestamped samples to a processing entity.

Other aspects and features will be clear from the drawings and descriptions.

DETAILED DESCRIPTION

One embodiment of the present invention is a method of determining the time for information to travel between sets of stations of a wireless network, and from such time difference of arrival information, to determine the likely location or locations of a wireless station using time difference of arrival (TDOA).

The Managed Wireless Network

One embodiment of the invention operates in a managed wireless network in which a set of APs and their respective clients are managed by a central management entity. One embodiment of the managed wireless network substantially conforms to the IEEE 802.11 standard. By substantially conforming we mean compatible with. Some aspects of the IEEE 802.11 standard are modified slightly to accommodate some management aspects used in the invention. In particular, for some aspects of the invention, additional MAC frames are assumed for encapsulating information used for the TDOA calculations.

Depending on the size and complexity, a managed network is either a set of APs with a central control entity, or a hierarchical structure with a set of hierarchical control domains that eventually are coupled to a set of APs. Each control domain is managed by a management entity we call a manager herein. The number of levels in the hierarchy depends on the complexity and/or size of the network, and thus not all managed networks have all levels of control. For example, a simple managed network may only have one level of control with a single management entity controlling all the APs. Factors that influence the selection of control domains include one or more of: the various types of IP subnet configurations; the radio proximity of the access points; the client station roaming patterns; the real time roaming requirements, and the physical constraints of the network (e.g. campus, building, and so forth).

In this description, we assume a single management entity we call the WLAN Manager. Management entities, we call Subnet Context Managers may be included, each controlling some aspects of a single subnet or virtual local area network (VLAN). A Subnet Context Manager, for example, may relay instructions from the WLAN manager to all managed APs in its subset or VLAN. In some embodiments, the functions of the subnet context manager are carried out at a higher level, e.g., at the same level as the WLAN Manager. Other embodiments may have a different number of levels in the hierarchy with different levels of management. For example, in some embodiments, the functions of the subnet context manager are carried out at a higher level, e.g., at the same level as the WLAN Manager. For more information on radio management, see above-referenced U.S. patent application Ser. No. 10766,174 titled "A METHOD, APPARATUS, AND SOFTWARE PRODUCT FOR DETECTING ROGUE ACCESS POINTS IN A WIRELESS NETWORK" to inventors Olson, et al., assigned to the assignee of the present invention, and incorporated herein by reference.

The WLAN Manager manages several aspects of the wireless network, e.g., security, and in one embodiment, authorizes a set of access points in the network—we call these the managed access points—including maintaining a database called the Configuration Database that contains configuration parameters. The Configuration Database also includes an AP database that includes information on the managed APs, e.g., a list of the managed APs together with some data related to these APs, such as the location of the APs and the power the APs are set to transmit at. A single WLAN Manager is typically deployed to handle all the wireless clients within the enterprise campus. The WLAN Manager provides centralized control of various aspects of the radio environment within a given set of APs, including the location determining aspects of the present invention by receiving timestamped sets of received samples from a set of APs as a result of transmissions by one or more other APs, and in some embodiments, further by receiving information from the transmitting APs. In one embodiment, the transmitting is also under control of the WLAN manager.

Thus, aspects of the invention are implemented on the WLAN Manager and use information obtained under control of the WLAN manager. However, the invention does not require there to be a single WLAN Manager entity. The functionality described herein may be incorporated into any of other management entities, e.g., at a local level or by a separate manager called the Radio Manager that controls the radio aspects of the WLAN. Furthermore, any of these management entities may be combined with other functionalities, e.g., switching, routing, and so forth.

Figure 1:
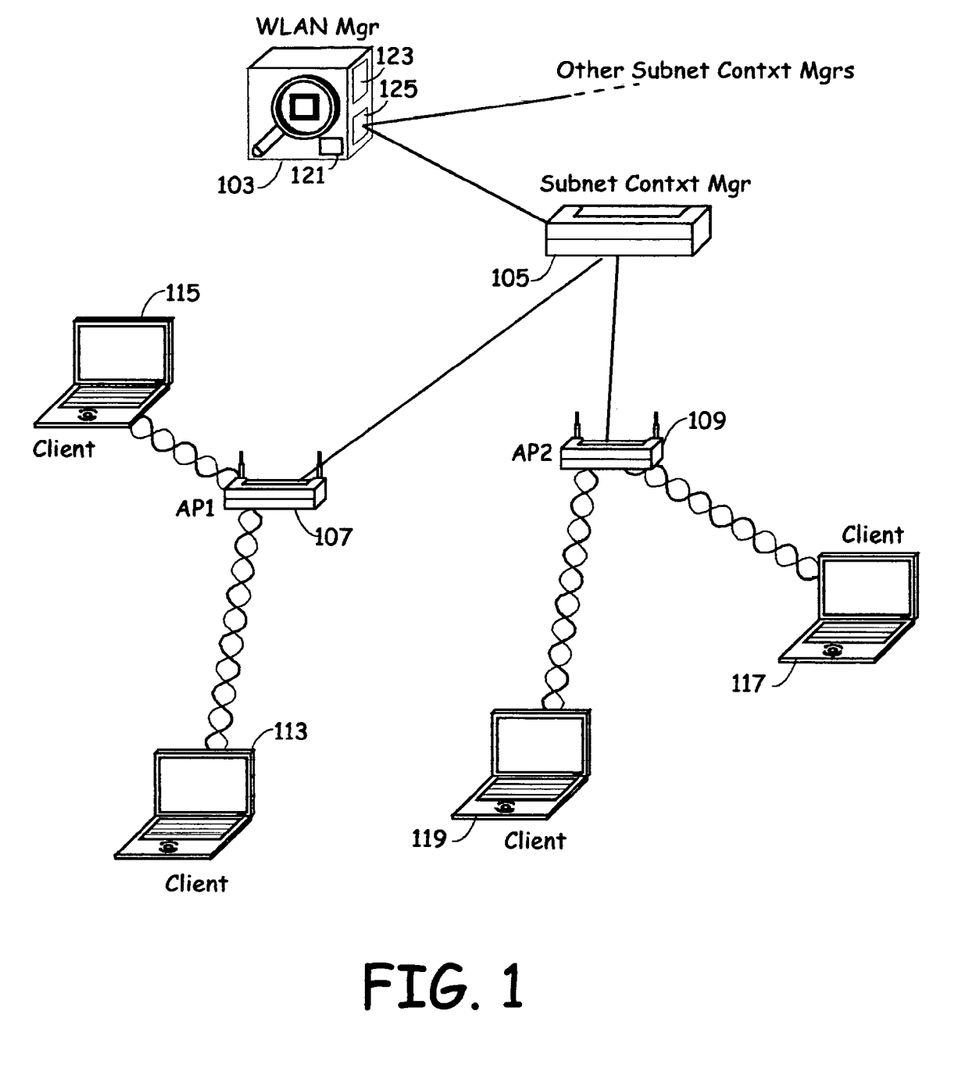
FIG. 1 shows one example of a network in which the present invention operates, including a management entity called the WLAN manager.

A simple managed network is shown in FIG. 1. All managers are assumed incorporated into a single management entity—the WLAN Manager. It is to be understood that the WLAN Manager incorporates the functions of the Radio Manager.

FIG. 1 shows a WLAN manager 103 that includes a processing system 123 with one or more processors and a memory 121. The memory 121 includes instructions that cause one or more processors of the processing system 123 to implement the aspects of the present invention that are implemented in the WLAN Manager. The WLAN manager 103 includes a network interface 125 for coupling to a network, typically wired. In one embodiment, the WLAN manager is part of a network switch and operated under a network operating system, in this case IOS (Cisco Systems, Inc., San Jose, Calif.).

The WLAN Manager 103 is coupled via its network interface 125 and a network (typically a wired network) to a set of Subnet Context Managers. One such Subnet Context Manager is shown as element 105 in FIG. 1. All managed APs in a subnet register with a Subnet Context Manager. For example, in FIG. 1, the APs named AP1 and AP2 (107 and 109, respectively) are each apart of the same subnet and have a network connection to Subnet Context Manager 105. Any management communication between the WLAN Manager 103 and APs 107 and 109 is then via the Subnet Context Manager 105.

A client station associates with an AP. Thus, in FIG. 1, APs 107 and 109 are each shown with associated clients 113, 115, and 117, 119, respectively. By a managed client we mean a client that associates with a managed AP. Thus, clients 113, 115, 117, and 119 are managed clients.

A wireless network uses management frames at the MAC layer designed, sent, and received for management purposes. For example, in a WLAN that conforms to the IEEE 802.11 standard, an AP regularly transmits beacon frames that announce the AP's presence, i.e., advertises the AP's services to potential clients so that a client may associate with the AP. Similarly, a client can send a probe request frame requesting any AP in its radio range to respond with a probe response frame that, in a similar manner to a beacon frame, provides information for the requesting client (and any other radios in its radio range and able to receive its channel) sufficient for a client to decide whether or not to associate with the AP.

Wireless Station Architecture

Figure 2:
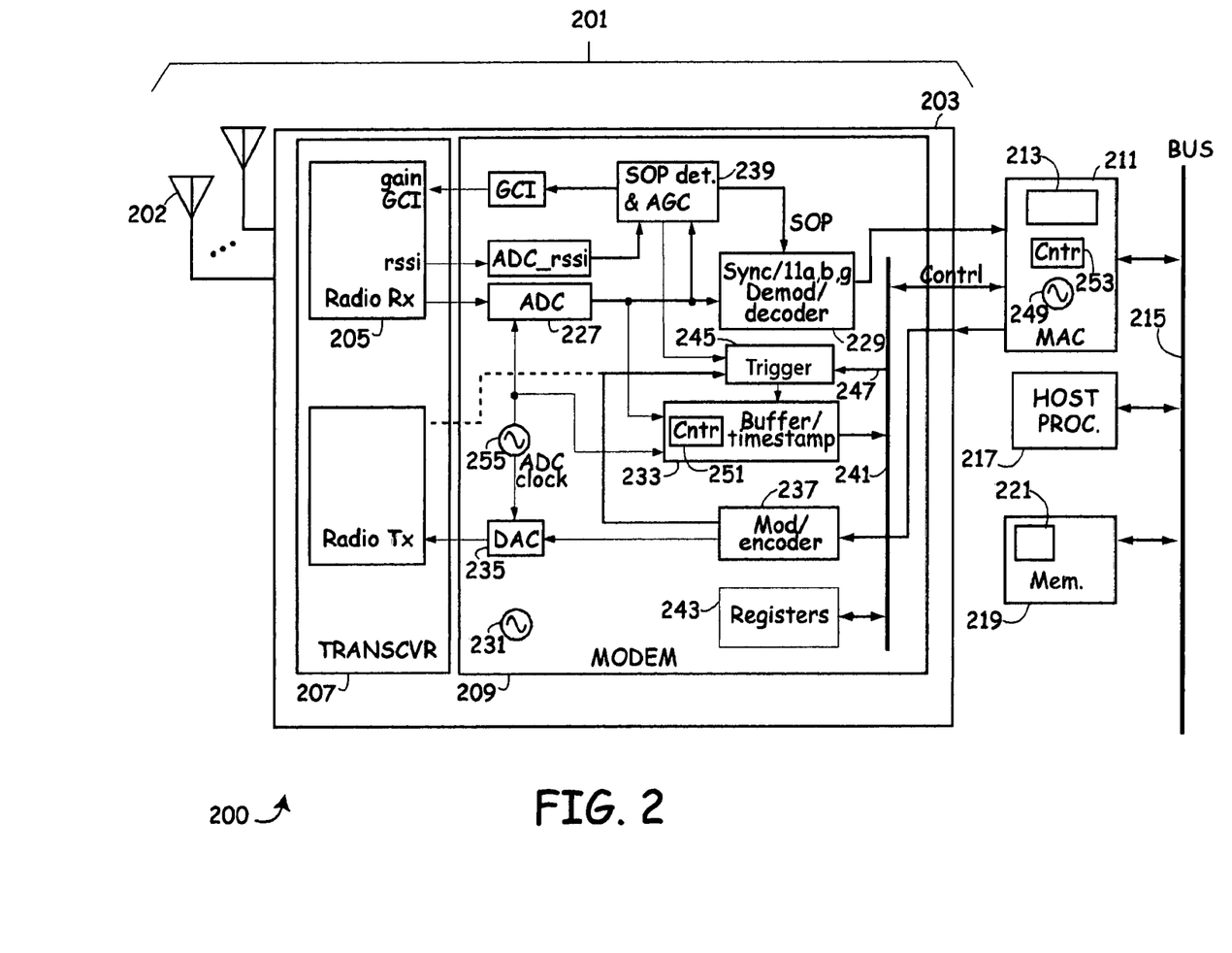
FIG. 2 shows a simple block diagram of one embodiment of a wireless station that may be an AP or a client station and that implements one or more aspects of the invention.

FIG. 2 shows one embodiment of a wireless station 200 that may be an AP or a client station and that implements one or more aspects of the invention. A physical layer processing part (the PHY) 201 includes one or more antennas 202 that are coupled to a radio 203 that includes an analog radio transceiver 207 and a digital modem 209. The digital modem of PHY 201 is coupled to a MAC processor 211 that implements the MAC processing of the station. The MAC processor 211 runs with a MAC clock 249 and is connected via one or more busses, shown symbolically as a single bus subsystem 215, to a host processor 217. The host processor includes a memory subsystem 219, e.g., RAM and/or ROM connected to the host bus, shown here as part of bus subsystem 215. Not shown is an included interface to a wired network.

In one embodiment, the MAC processing, e.g., the IEEE 802.11 MAC protocol, is implemented totally at the MAC processor 211. The Processor 211 includes a memory 213 that stores the instructions for the MAC processor 211 to implement some of the MAC processing, and in one embodiment, some or all of the additional processing used by the present invention. The memory is typically but not necessarily a ROM and the software is typically in the form of firmware.

The MAC processor is controlled by the host processor 217. In one embodiment, some of the MAC processing is implemented at the MAC processor 211, and some is implemented at the host. In such a case, the instructions for the host 217 to implement the host-implemented MAC processing are stored in the memory 219. In one embodiment, some or all of the additional processing used by the present invention is also implemented by the host. These instructions are shown as part 221 of memory 219.

The analog transceiver 207 includes a receiver 205 and a transmitter. The receiver outputs one or more received signal strength indicator (RSSI) signals and the received signal, in one embodiment in the form of an analog low-intermediate-frequency low-IF) signal of 20 MHz bandwidth centered at 20 MHz. The receiver 205 accepts gain control signals from the digital modem via a gain control interface.

The transmitter accepts I and Q quadrature baseband signals from the modem 209 and transmits the signals at a power setting controlled from the modem. Such control is not shown in FIG. 2.

The digital modem accepts the analog low-IF received signals and digitizes them using an analog-to-digital converter 227 to generate a sequence of received signals. The ADC 227 samples at a sample rate determined by an ADC clock 255 that in turn is related to a local clock 231. In one embodiment, the ADC samples at 80 MHz.

Note, those in the art will understand that by clocks being related we mean that the rates of the clocks are related. Thus, the statement the ADC clock 255 is related to the local clock 231 would be understood to mean that there is a relationship between the rate of the ADC clock 255 and the rate of the local clock 231.

The RSSI signal is also digitized, and both the received signal samples and the RSSI signal(s) are inputed to a start of packet (SOP) and automatic gain control (AGC) subsystem 239 that determines when the SOP occurs, and also generates signals to automatically provide signals via a gain control interface to the analog receiver 205 for gain control.

The received signal samples are input to a synchronization/demodulator/decoder subsystem 229 for 802.11a, 802.11b, and 802.11g signals that includes an OFDM subsystem and a DSSS/CCK subsystem. The OFDM (802.11a, g) subsystem includes a synchronization circuit, a time to frequency converter, a demodulator, and a decoder; the DSSS/CCK (802.11b) subsystem includes a demodulator and a decoder. Either of these interprets the preamble of the packet, and then decodes any header information. The header information may include information on how to decode the remainder of the payload information in the packet, according to the appropriate standards. The output of the synchronization/demodulator/decoder subsystem 229 includes decoded packet data that is provided to the MAC processor 211 for MAC layer processing.

The modem further includes a trigger circuit 245 coupled to the receiver and transmitter to indicate when a packet is received and when a packet is transmitted, a timestamping subsystem, e.g., a timestamping clock coupled to the local clock 231, and a buffer subsystem coupled to the trigger subsystem 245. The embodiment shown includes a combined timestamping/buffer subsystem 233 that includes a counter 251, and it would be clear to those in the art that this combined unit may be implemented as two separate subsystems. The timestamping/buffer subsystem 233 accepts the received signal samples, a measure of the ADC clock, and an early SOP indication from the SOP and AGC subsystem 239 via the trigger 245. The buffer/timestamp subsystem 233 stores the sample values for a period of time, and further has the ability to timestamp the stored samples. In one embodiment, the timestamping is according to the counter 251, and the counter 251 increments at the same frequency as the ADC clock, such that the timestamping is according to the ADC clock.

In alternate embodiments, the ADC clock runs at a frequency that is an integer multiple of the frequency of the timestamping subsystem. In one such alternate embodiment, the timestamping subsystem includes a clock, e.g., a counter that counts at ½ the frequency of the ADC clock.

Note that in some embodiments, if the number of bits of counter 251 is not sufficient to provide unambiguous timestamps, e.g., if it is too short, the timestamp generated by counter 251 may be extended by using the counter 251 for the low order bits, and a value according to a clock signal from the MAC processor 211 to set to higher order bits.

One aspect of the invention uses the buffer/timestamp subsystem 233 to capture and timestamp received signal samples for later processing in order to determine an exact time of the start of packet. The buffer/timestamp subsystem also provides a set of received samples for diagnostic purposes.

Another aspect of the invention is to use the buffer/timestamp subsystem 233 to indicate to the MAC subsystem when a packet is transmitted.

The modem 209 includes a bus subsystem 241 coupled to the MAC processor 211, and to the buffer/timestamp subsystem 233. The bus subsystem 241 enables the MAC processor to provide control signals to the modem, including setting the values of a set of control registers 243. The bus system further enables the MAC to obtain information from the register set 243, and also to obtain timestamped samples from the buffer/timestamp subsystem 233.

The modem further includes a modulator/encoder to generate complete packets according to the version of the standard, e.g., 802.11 standard being used, including preamble information, header information, and payload of MAC frames provided by the MAC processor 211. The output of the modulator/encoder subsystem 237 are converted to analog signals, in one embodiment, baseband or low IF I,Q signals by a digital-to-analog converter set 235. The analog to-be-transmitted signals are accepted by the radio transmitter part of the transceiver 207. The transmitter generates the antenna signals that are transmitted via the one or more antennas, in one embodiment, the same as the receiver antenna(s) 202.

Not shown in FIG. 2 are many of the signal paths, e.g., between the various subsystems and the register set 243.

Figure 3:
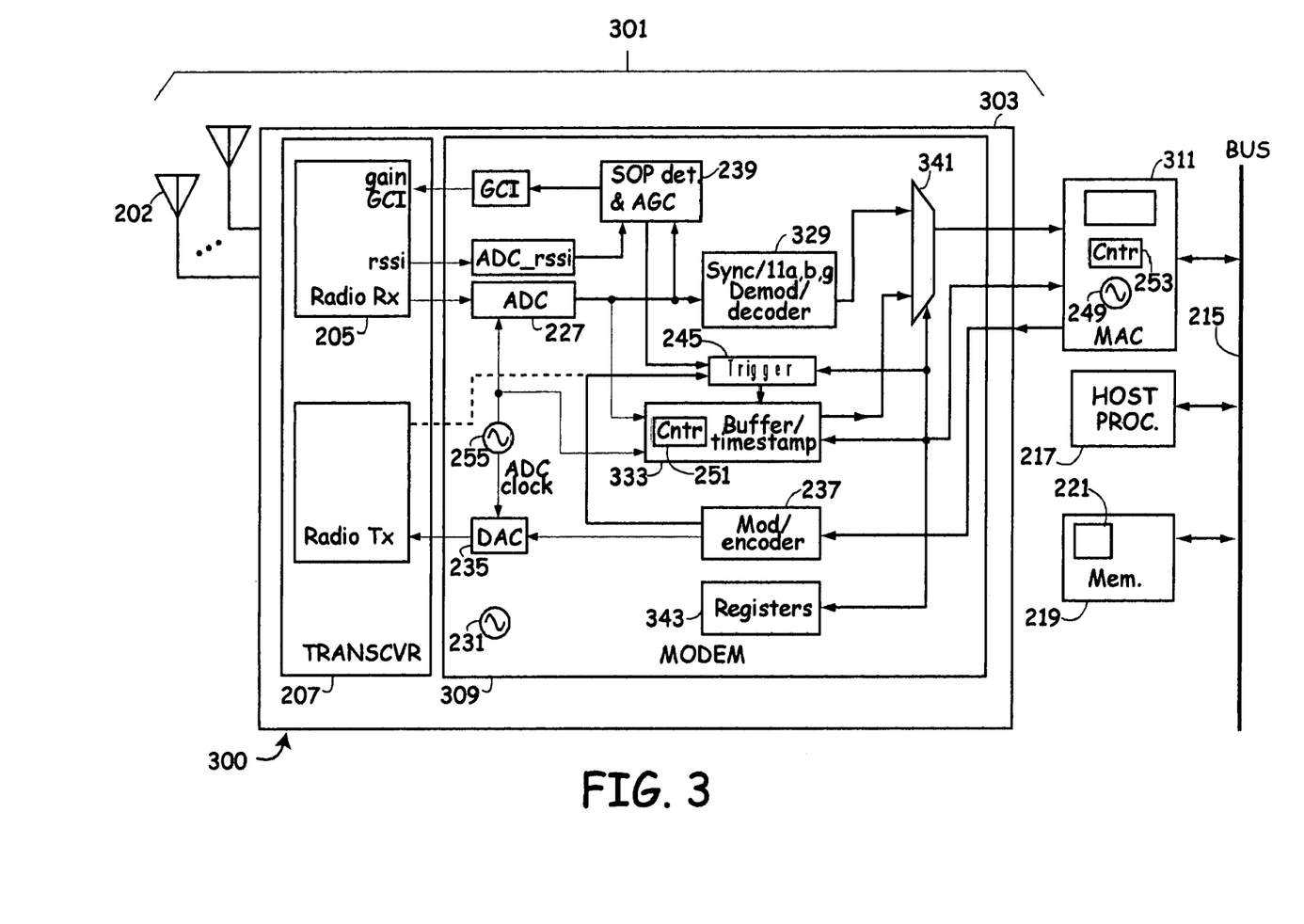
FIG. 3 shows a simple block diagram of an alternate embodiment that uses a selector rather than the bus structure of FIG. 2 to provide the contents of the trace buffer to the MAC, according to one or more aspects of the invention.

FIG. 3 shows a first alternate architecture in which the MAC selectively accepts input from the PHY of either the decoded received packet data from the synchronization/demodulator/decoder subsystem, referenced by numeral 329, or timestamped samples of received signals from the buffer/timestamp subsystem—referenced by numeral 333—via a selector circuit 341. The control information between the MAC processor 311 and elements of the modem, e.g., the register set 343 and/or the buffer/timestamp subsystem, and/or the synchronization/demodulator/decoder subsystem 329 is by direct connection.

Note that in FIGS. 2 and 3, the trigger circuit for controlling the timestamping of transmit time accepts input from the modulator/encoder 237, e.g., from any controller that controls the timing of the modulator/encoder. In alternate embodiments, there is a direct path from the transmitter in transceiver 207 to the trigger circuit. This is shown as a broken line in FIGS. 2 and 3.

Method of Generating Data for TDOA

TDOA requires fine time accuracy given that the speed of light is approximately 1 ft/ns. In the stations shown in FIGS. 2 and 3, the ADC clock operates at 80 MHz so that assuming a time resolution of one sample provides accuracy of approximately ±6.25 ns or ±6.25 feet.

In the embodiments described herein, the buffer/timestamping subsystem provides for the capturing of a sequence of received samples for further processing, e.g., post-processing. Furthermore, a plurality of receiving and/or transmitting wireless stations are required for TDOA radiolocation, so that the capture of received samples needs to be related to captures to/from other stations. Another aspect of the invention is associating the capture of received samples with a timestamp.

This information is forwarded to the WLAN manager for further processing.

In one embodiment, the buffer/timestamping subsystem further provides for recording the time a packet is transmitted for TDOA radiolocation.

In an alternate embodiment, processing to determine the time of arrival as a fraction of ADC clock interval could be carried out in an adjunct processor associated with the modem so that the data volume to be transmitted to the WLAN manager can be minimized.

Thus, one aspect of the invention includes determining the relative locations of a set of wireless stations of a wireless network. Each station includes a local timestamping subsystem, e.g., a timestamping clock for recording times of arrival, and another aspect of the invention includes mutually synchronizing the local timestamping clocks of the stations. In one embodiment, this is done by determining the relationship between the local clocks and a global time, e.g., a global clock, or otherwise synchronizing the local clocks of the stations to a global clock common to all the stations used for radiolocation. Global time in this sense could be defined, for example, to be that time kept by one station designated as the global timekeeper All other access points would have their time difference from that master measured and corrected or the clock time error noted for future use in the localization process.

Another aspect includes not requiring high accuracy clocks, e.g., assuming that the clock for recording times of arrival is an ADC clock that drifts over time. Yet another aspect allows for unknown delays between the time of reception and the recorded time, and for unknown delays between the time of transmitting, and recorded time of transmitting. Yet another aspect is recording events in time with a clock of the frequency of the ADC used to sample received signals.

Consider a plurality, denoted N, of APs (N>2). Suppose each AP has a clock that is locally accurate up to a linear frequency drift with time for a relatively short duration, e.g., of 2N packets. That is, suppose over a relatively short duration of 2N packets, given the correct time t, that the i'th AP, denoted AP, reports its local time, denoted by $t_i(t)$, as:

$$t_i(t)=a_i+b_i t+c_i t^2,$$

where $t_i(t)$ is the local time of the i'th AP at the actual, e.g., universal time denoted t, and $a_i$, $b_i$, and $c_i$ are parameters for the i'th AP that are constant for a time interval of interest, e.g., the time duration of 2N packets.

This corresponds to a clock ticking at a frequency, denoted $f_i(t)$, given by the derivative in time t of $t_i(t)$:

$$f_i(t)=b_i+2c_it,$$

where $b_i$ is the local clock frequency, and $2c_i$ represents a constant slow linear change in frequency, accurate over local time e.g., the 2N packets.

It is expected that such a model would be reasonably accurate to at least 20-30 packets.

In one embodiment, each AP uses an architecture similar to that shown in FIG. 2, and in another embodiment, to an architecture similar to that shown in FIG. 3. The local timestamping clock providing a measure of the local time $t_i$ is the clock, e.g., the clock 255 driving the analog-to-digital converter 227 generating the received signal samples (see FIGS. 2 and 3). In one embodiment, b1 is approximately 80 MHz, i.e., the clocks are each at the same nominal frequency. By a round robin transmission we mean that each AP transmits a packet in turn while the others listen for these transmissions. The order is not important, so long as each station transmits at least once.

One aspect of the invention includes the transmitting by the stations in a round robin manner, with the number of round robin transmissions sufficient to mutually calibrate the stations' local timestamping clocks under the assumption that any drift in the timestamping clocks of that station depends on one or more unknown parameters.

According to another aspect of the invention the transmitting by the stations in a round robin manner, with the number of round robin transmissions sufficient to mutually calibrate the stations' local timestamping clocks under further assumption that there may be unknown delay between the actual time of transmission and the time of timestamping, and/or that there may be unknown delay between the actual time of reception and the time of timestamping.

Thus, one aspect of the invention is that by a plurality of sets of round robin transmissions, a local common, precise time reference may be shared by all APs such that TDOA radiolocation may be carried out, even with the relatively inaccurate clock, and further, such that the locations of the APs relative to one another is established, to within a rotational and reflective ambiguity.

In one embodiment, at most two sets of round robin transmissions are used.

Those in the art would understand that the sharing of the time reference (the global time, or global clock) need not be explicit, but rather that the TDOA determination allows for the drift and/or unknown delays. We call such implicit or explicit sharing of a time reference "mutual calibration." This implies that there is no need to explicitly calculate what the "global time" is for each local clock, nor to reset each local clock.

Another aspect of the invention is the radiolocation of a station such as a rogue access station, e.g., rogue AP. For this, one embodiment includes assuming there are three known, e.g., managed APs whose locations relative to one another are known, e.g., using the two round robin transmissions of the first aspect. Suppose further that a common, precise time reference is shared by all APs which is achieved through the use of the same two round robin transmissions. By receiving and recording at each AP the packet received as a result of a transmission by the unknown station, and determining the time of arrival of the received packet provides for determining the location of the unknown station using TDOA.

Consider first the round robin transmitting by the set of APs. In one embodiment, the APs are managed APs, and the WLAN manager instructs each AP using a management MAC frame to move to the same transmit and receive channels, and to transmit in a round robin manner, e.g., to change to the same channel, and transmit a packet, one AP after another. The AP further is instructed to communicate to the WLAN manager a timestamp according to its local clock of when each transmission takes place. Such a timestamp is locally stored by the transmitting AP, and communicated at a later time to the WLAN manager.

Note that in an alternate embodiment, such a timestamp could be encapsulated in the packet itself, and then sent on to the WLAN manager by the receiving station together with the timestamped received samples. In yet another embodiment such a timestamp could be pre-encoded with a fixed timestamp value and the packet transmitted when that timestamp is reached.

Each receiving AP is further instructed to move to capture mode wherein it receives the packet at an approximately known time, determines the start of packet (SOP) time, and stores the samples of the received packet in a storage buffer together with a timestamp generated by a clock local to the AP to indicate the time of the samples in the buffer, e.g., the time of the first sample. Referring to FIG. 2, the MAC 211 receives a special management frame from the WLAN manager that indicates the approximate time(s) that the AP can expect to receive a packet. The MAC provides an expected time signal 247 to the trigger circuit 245 that also accepts a SOP signal from the SOP detector subsystem 239 and also accepts a signal from the transmitter. The trigger circuit 245 generates a logical function of the expected time and the SOP time such that the storing of the samples by the buffer/timestamp subsystem 233 is triggered by a function of the expected time of arrival and the SOP time determined at the AP. For example, received packet may be very weak at some APs, e.g. below the noise floor. Therefore the trace buffer capture is first triggered by the expected packet time, and then re-triggered by a SOP signal generated by the SOP detector 239, such that the capture and timestamp restarts at the SOP time.

Note that it is expected that there is a delay from between the trigger and the actual start of capture. To accommodate such a delay, and ensure that all the required data is captured, even data that was sampled before the trigger took effect, the storing of the of the data in the buffer/timestamping unit 233 occurs all the time. When a trigger signal is issued, the stopping of the capture occurs some settable number of samples after the trigger signal such that there is a settable number of samples captured that occurred prior to the trigger signal starting the capture.

The trigger circuit also triggers the timestamping of when a packet is transmitted.

It is desirable to have the timestamp be as fine as needed to achieve the desired accuracy. In one embodiment, the timestamp is generated by a clock at the same rate as the ADC generating the samples. Referring to FIG. 2, the timestamp is provided by the ADC clock 255 in the PHY for controlling the ADC 227. Any MAC clock, e.g., MAC clock 249 if used, is preferably synchronized to the clock 255 of the ADC 227.

In one embodiment, the capture length is approximately 100 μs. In general, it is in the range 10 μs to 200 μs to achieve sensitivity and accuracy.

One aspect of the invention is that fine time-precision is not required at this stage for the SOP timestamping. The aspect of invention provides for determining a more accurate SOP using the captured samples. A further aspect of the invention provides for time precision beyond that suggested by the bandwidth, i.e., so-called super-resolution time precision.

In one embodiment, the captured samples and associated timestamp are accepted by the MAC processor 211. The MAC processor 211 and the host processor 217 form a new management type MAC frame that encapsulates the data for later processing. The MAC frame encapsulating the captured samples and timestamp is transmitted by the AP to the WLAN manager for postprocessing. As described further below, the postprocessing determines the time of arrival (according to each AP's local clock) and further determines the local time and position of the APs to within a rotational and/or reflective ambiguity.

The MAC processor further encapsulates the timestamp of each transmission and sends the MAC frame including the transmit timestamp to the WLAN manager for postprocessing.

In one embodiment, there are two round-robin transmissions. During each round-robin transmission, each AP transmits a packet in turn and all the other APs record that packet and timestamp it. There are 2N packets in all. This is enough to establish:

A local common, precise time reference shared by all APs.
A TDOA-based distance estimation between the APs to establish the AP topology to within a rotational and/or reflective ambiguity.

To demonstrate how such calculations are carried out, consider first the case of an accurate clock, i.e., suppose there is no frequency change in the period of interest. Consider a pair of APs, denoted $AP_1$ and $AP_2$, respectively. That is, $f_n(t)=b_n$, and $t_n(t)=a_n+b_n t$, where n=1 or 2 for the two APs. Suppose the two clocks are of equal frequency such that $b_1=b_2$ over the time of interest. Consider the local time of each the station normalized to the local clocks such that $b_1$ and $b_2$ are each 1. Denote by $t_{0m}$ the global time when station m transmits a packet. m=1,2 for two stations. Denote by $T_{nm}$ the time of flight of a packet between station n and m, m=1,2 for two stations. Consider $AP_1$ transmitting at some global time $t=t_{01}$. Then the time at $AP_1$ when the packet is transmitted denoted $t_{11}$, is $$t_{11}=t_1(t_{01})=a_1+t_{01} \qquad \text{Eq. 1}$$

As a notation, suppose that times related to transmission and reception of packets are denoted $t_{xy}$. Let y denote the packet number. Let x denote what time reference that packet is received or transmitted at. x=0 denotes global time, while x=1, 2 respectively denotes reception or transmission at station 1, 2, respectively. Thus $t_{11}$ is the time at station 1 (x=1) for packet 1, which is this case is a time of transmission. $AP_2$ receives this packet at global time $t=T_{12}+t_{01}$. The local time for $AP_2$, denoted $t_{21}$, is now $$t_{21}=t_2(T_{12}+t_{01})=a_2+T_{12}+t_{01}. \qquad \text{Eq. 2}$$

Note the notation $t_{21}$ indicates the time at station 2 when packet 1 is received.

Suppose that $AP_2$ transmits a second packet at some time t denoted $t_{02}$. Then the time at $AP_2$ corresponding to $t=t_{02}$, denoted $t_{22}$, is $$t_{22}=t_2(t_{02})=a_2+t_{02}. \qquad \text{Eq. 3}$$

$AP_1$ receives this packet at $t=t_{02}+T_{21}$. For $AP_1$, this is the local time, denoted $t_{12}$, as follows $$t_{12}=t_1(t_{02}+T_{21})=a_1+t_{02}+T_{21}. \qquad \text{Eq. 4}$$

It is reasonable to assume that the time of flight is the same in either direction, i.e., to assume that $T_{12}$ is the same as $T_{21}$. Assume further than the global times $t_{01}$ and $t_{02}$ are unknown. Without loss of generality, because time differences are important, $t_{01}$ can be arbitrary, so it is reasonable to assume $t_{01}=0$. Now $t_{11}$, $t_{12}$, $t_{21}$, and $t_{22}$ are known or obtained from the trace buffer contents and timestamps. Eqs. 1-4 with $t_{01}=0$ are a set of four simultaneous equations with four unknowns, expressed in matrix form as:

$$\begin{pmatrix} 1 & 0 & 0 & 0 \\ 0 & 1 & 1 & 0 \\ 1 & 0 & 1 & 1 \\ 0 & 1 & 0 & 1 \end{pmatrix} \begin{pmatrix} a_1 \\ a_2 \\ T_{12} \\ t_{02} \end{pmatrix} = \begin{pmatrix} t_{11} \\ t_{21} \\ t_{12} \\ t_{22} \end{pmatrix} \qquad \text{Eq. 5}$$

The matrix of Eq. 5 is invertible, such that solving for $T_{12}$ is straightforward. $T_{12}$ is a measure of the distance between the two APs.

Furthermore, solving for $a_1$ and $a_2$ provides a measure of the true time at each AP based on the local time.

Thus when there is no local clock drift for the clock used to provide the timestamps, a single round robin not only establishes the distance between the pair of APs, but also provides a universal time frame.

Suppose now that the clocks of the two stations are not the same frequency, that is, $b_1$ is not the same as $b_2$. This typically occurs, even with clocks that have the same nominal frequency. Thus, the model $t_n(t)=a_n+b_n t$ holds. Suppose the WLAN manager instructs the two APs to transmit two round robins at times $t=t_{01}$ and $t=t_{03}$ for $AP_1$ and times $t=t_{02}$ and $t=t_{04}$ for $AP_2$. Assume, as before, that $t_{01}=0$.

When $AP_1$ first transmits, then the time at $AP_1$, denoted $t_{11}$, is $$t_{11}=a_1+b_1 t_{01}=a_1. \qquad \text{Eq. 6}$$

$AP_2$ receives this packet at time $t=T_{12}$. For $AP_2$, this is the local time, denoted $t_{21}$, $$t_{21}=a_2+b_2(T_{12}+t_{01})=a_2+b_2 T_{12}. \qquad \text{Eq. 7}$$

$AP_2$ first transmits the packet at some time $t=t_{02}$. Suppose this is close enough to when it received the packet such that $b_2$ has not changed. Then the time at $AP_2$, denoted $t_{22}$ is $$t_{22}=t_2(t_{02})=a_2+b_2 t_{02}. \qquad \text{Eq. 8}$$

$AP_1$ receives this packet at $t=t_{02}+T_{21}=t_{02}+T_{12}$ assuming $T_{21}=T_{12}$. For $AP_1$, this time is the local time, denoted $t_{12}$. Assume that $b_1$ also has not changed. Then $$t_{12}=t_1(t_{02}+T_{12})=a_1+(t_{02}+T_{12})b_1. \qquad \text{Eq. 9}$$

Now $AP_1$ retransmits at global time $t=t_{03}$, starting the second round robin. Then, at $AP_1$, the time of the second transmission is the local time, denoted $t_{13}$, given by $$t_{13}=t_1(t_{03})=a_1+b_1 t_{03}. \qquad \text{Eq. 10}$$

This packet arrives at $AP_2$ time $T_{12}$ later, that is, at $t=t_{03}+T_{12}$ which for $AP_2$ is local time, denoted $t_{23}$, of $$t_{23}=t_2(t_{03}+T_{12})=a_2+b_2(t_{03}+T_{12}) \qquad \text{Eq. 11}$$

$AP_2$ now transmits a packet at some time $t=t_{04}$. Then the local time at $AP_2$, denoted $t_{24}$ is $$t_{24}=t_2(t_{04})=a_2+b_2 t_{04}. \qquad \text{Eq. 12}$$

$AP_1$ receives this packet at $t=t_{04}+T_{21}=t_{04}+T_{12}$ assuming $T_{21}=T_{12}$. For $AP_1$, this time is the local time, denoted $t_{14}$, as follows $$t_{14}=t_1(t_{04}+T_{12})=a_1+b_1(t_{04}+T_{12}) \qquad \text{Eq. 13}$$

Eqs. 6 through 13 are eight equations in the following eight unknowns: $T_{12}$, $a_1$, $a_2$, $b_1$, $b_2$, $b_{12}$, $b_{22}$, $t_{02}$, $t_{03}$, and $t_{04}$. Recall, the time t01 was implicitly given by $t_{01}=0$.

This is a soluble system of quadratic simultaneous equations. Methods for solving nonlinear, especially quadratic simultaneous equations are generally known and may then be used to determine the distance between the two APs, and further to determine the values of $a_1$, $a_2$, $b_1$, and $b_2$ that relate the local AP clocks to the global time.

Suppose further that it is assumed that there is some frequency drift, e.g., suppose that for each station i i=1,2, $$t_i = a_i + b_i t + c_i(t)^2 \qquad \text{Eq. 14}$$

Suppose the WLAN manager instructs the two APs to transmit three round robins at times $t=t_{01}$, $t=t_{03}$, and $t=t_{05}$, (with $t_{01}$ arbitrarily set to 0) for $AP_1$ and at times $t=t_{02}$, $t=t_{04}$, and $t=t_{06}$, for $AP_2$.

Following the same analysis as described above, the following table describes a set of 12 cubic simultaneous equations for three round robins. In these equations, assume $T_{12}=T_{21}$. Also, $t_{01}=0$.

| Round robin number | From, to | At | Equation |
|---|---|---|---|
| 1 | 1,2 | 1 | $t_{11} = a_1 + b_1(t_{01}) + c_1(t_{01})^2$ |
| 1 | 1,2 | 2 | $t_{21} = a_2 + b_2(t_{01} + T_{12}) + c_2(t_{01} + T_{12})^2$ |
| 1 | 2,1 | 2 | $t_{22} = a_2 + b_2(t_{02}) + c_2(t_{02})^2$ |
| 1 | 2,1 | 1 | $t_{12} = a_1 + b_1(t_{02} + T_{12}) + c_1(t_{02} + T_{12})^2$ |
| 2 | 1,2 | 1 | $t_{13} = a_1 + b_1(t_{03}) + c_1(t_{03})^2$ |
| 2 | 1,2 | 2 | $t_{23} = a_2 + b_2(t_{03} + T_{12}) + c_2(t_{03} + T_{12})^2$ |
| 2 | 2,1 | 2 | $t_{24} = a_2 + b_2(t_{04}) + c_2(t_{04})^2$ |
| 2 | 2,1 | 1 | $t_{14} = a_1 + b_1(t_{04} + T_{12}) + c_1(t_{04} + T_{12})^2$ |
| 3 | 1,2 | 1 | $t_{15} = a_1 + b_1(t_{05}) + c_1(t_{05})^2$ |
| 3 | 1,2 | 2 | $t_{25} = a_2 + b_2(t_{05} + T_{12}) + c_2(t_{05} + T_{12})^2$ |
| 3 | 1,2 | 3 | $t_{26} = a_2 + b_2(t_{06}) + c_2(t_{06})^2$ |
| 3 | 1,2 | 1 | $t_{16} = a_1 + b_1(t_{06} + T_{12}) + c_1(t_{06} + T_{12})^2$ |

Each additional transmission adds one unknown, but provides two known quantities. Thus, by more round robins, the number of equations available can be made sufficient to enable solving for the required number of unknowns, or even to provide more equations, i.e., an over-determined system of equations.

In alternate embodiments, alternate other relationships may be used for the time relationship between the set(s) of round robins to generate a sufficient number of equations to solve for the unknowns: namely the time-of-flight $T_{12}$ and the clock parameters.

Furthermore, it would be clear to those in the art that the assumption of the local clock drifting linearly in frequency for the duration of the round-robins may be relaxed so that there are more unknowns, e.g., in one alternate embodiment, the relationship between global time and local time may be assumed to be, for a number N of APs:

$$\text{local time } t_i = a_i + b_i t + c_i t^2 + d_i t^3 \text{ for } i=1, \ldots, N. \qquad \text{Eq. 23}$$

For a pair of APs denoted $AP_1$ and $AP_2$, with $AP_1$ transmitting at times $t=t_{01}=0$, $t=D$, and $t=2D$, with D known, and AP2 transmitting at times $t=D_2$, $D_2+D$, and $D_2+2D$, such that, with the frequency normalized such that $b_1=1$, a set of twelve equations with nine unknowns: $a_1$, $c_1$, $d_1$, $a_2$, $b_2$, $c_2$, $d_2$, $T_{12}$ and $D_2$ may be formed with three round robins, such that the relationship of the local AP clocks to the global time, and the inter-AP distance may be determined.

Furthermore, the method may be extended to accommodate further known quantities. For example, another model includes, for each transmitting station, a transmit delay. This delay is the delay between the initiation of a packet for transmission and the commencement of transmission of the packet at the transmit antenna of the station. Similarly, the timing model may include for each receiving station, a receiver delay. This delay is the delay between receipt of the first energy at the receiver antenna of the station and the time when accurate SOP is detected such that the accurate timestamp is recorded at the receiving station.

In one embodiment, a calibration method is included to determine such delays. How to perform auto-calibration experiments that determine the delays of each station would be known. Alternately, such delays may be estimation, or assumed known, e.g., having nominal values.

To determine the location of more than two APs, the distance is estimated between each pair of APs in the topology. For a number N of APs, each AP transmits twice and receives all 2(N−1) packets transmitted by the other (N−1) APs, providing sufficient information for location estimation. Prior to the transmissions, all APs are instructed by the WLAN manager to receive at the same channel as the transmitting AP. As a result of the location determination, a rotational ambiguity remains, and can be resolved using GPS or other methods.

In one embodiment, each transmitting AP also sends a packet that includes the value of its local clock, i.e., its local timestamp at time of transmission, to the AP manager so that TDOA may be determined.

Determining the Location of Rogue APs

Another aspect of the invention is determining the location of an additional wireless station, e.g., a device that may be a rogue device, referred to herein as a rogue device, even though the additional device may later prove to not be a rogue device. For this radiolocation aspect, at least three stations are used for receiving transmission(s) from the rogue device.

In one embodiment, the at least three stations are managed APs. Radiolocation of the rogue device by TDOA is possible when the APs' locations relative to each other are known, and when there is a common, relatively precise time reference shared by all APs.

In one embodiment, the relative locations and the relationship of a set of local clocks of each AP used for timestamping received signals are determined as described above by a set of round robin transmissions between the APs in a channel in which all APs are listening.

When the rogue device transmits a packet, at least some of the stations receive a packet transmitted by the rogue station. One embodiment includes, at each receiving station, sampling the received signal corresponding to a received packet according to a local sampling clock (the ADC clock of the receiving AP), capturing samples in a memory, timestamping the captured samples using the local clock, and sending the timestamped captured samples to a central entity, e.g., encapsulated in a special frame. The central entity can determine the times of arrival of the packet at each receiving station, and from the determined times of arrival and the relationship between each receiving station's local clock, determine the relative positions of the additional station.

Because the parameterized clock model used to model each AP's local clock is only accurate for a relatively small period of time, the inventors found it preferable to carry out the round robin transmissions that determine the relationships of the local AP's clocks (the respective local time) to a clock common to all APs (the global time) close in time to the receiving of the transmission(s) by the rogue device.

One embodiment includes, as soon as stations receive a transmission from a rogue device, sending a management frame to the WLAN manager. The WLAN manager at this point instructs all APs that received and sent timestamped received signal records to carry out the round robin transmissions (including moving to a common channel for the round robin transmissions) and report back to the WLAN manager the timestamped records of the received signals for such round robin transmissions. The central WLAN manager now has the timestamped records sufficient to determine the times of arrival of the round robins transmissions, and then to determine the relationship of each station's local clock to the global clock, to determine the spatial relationship of the managed APs, and further to determine the times of arrival of a packet transmitted by the rogue device in order to carry out radiolocation of the rogue.

In an alternate embodiment, if it is possible to induce the rogue device to transmit, the radiolocation method includes:
  moving all APs to a selected channel such that transmissions on that channel can be received;
  carrying out a first round robin, with all receiving APs reporting their timestamped received signal records to the WLAN manager;
  inducing the rogue device to transmit, e.g., on the selected channel;
  receiving signals at the APs corresponding to the transmission by the rogue, recording and timestamping sampled of received signals corresponding thereto; and reporting the timestamped received signal records to the WLAN manager; and
  carrying out a second round robin such that the transmissions can be received, with all receiving APs reporting their timestamped received signal records to the WLAN manager.

The WLAN manager now has all the data needed to determine the spatial relationship of the APs, to determine the relationships of the APs' respective local clocks to a global clock, to determine the times of arrival of the transmission from the rogue device, and then to carry out radiolocation of the rogue device.

Generating the Timestamp.

One aspect of the invention is using the ADC clock to provide the timestamp for the time of receipt of a packet, and further for providing the timestamp for the time of transmission of a packet.

In one embodiment, the generating of the timestamp uses a counter 251 in the timestamp/buffer subsystem 233 locked to the ADC sampling clock 255. In another embodiment, a hybrid technique is used, in which, the complete timestamp sent to the WLAN manager is made up of a number of least significant bits (LSBs): the counter 251 locked to the ADC clock 255, and a number of most significant bits (MSBs) according to a clock in the MAC processor, e.g., clock 249, that is forced to be synchronized to the ADC clock 255 (via the counter 251 locked to the ADC clock 255). The MAC processor maintains another counter 253 that increments, in one embodiment, at the rate of the MAC clock 249 that in such an embodiment is frequency-locked to the PHY ADC clock 255, and, in another embodiment, via an interrupt processor that occurs every time the counter 251 of the PHY rolls over.

Data Encapsulation

Another aspect of the invention is the use of the MAC processor 211 to obtain data from the buffer/timestamp subsystem 233,—packetize the information, e.g., in an Ethernet packet, and send the information to the WLAN manager, e.g., over an Ethernet for further processing. Thus, the set of captured timestamped samples, and also the transmit timestamps are sent to a central processing entity using one or more Ethernet packets. Alternate embodiments may use other than Ethernet packets, as would be clear to those in the art.

The information includes, in the case of a transmitting station, the timestamp of the time of transmission of a packet, and in the case of a receiving station, a number of received samples corresponding to a packet being received, together with the timestamp value corresponding to a known point of the sampling buffer.

Figure 4:
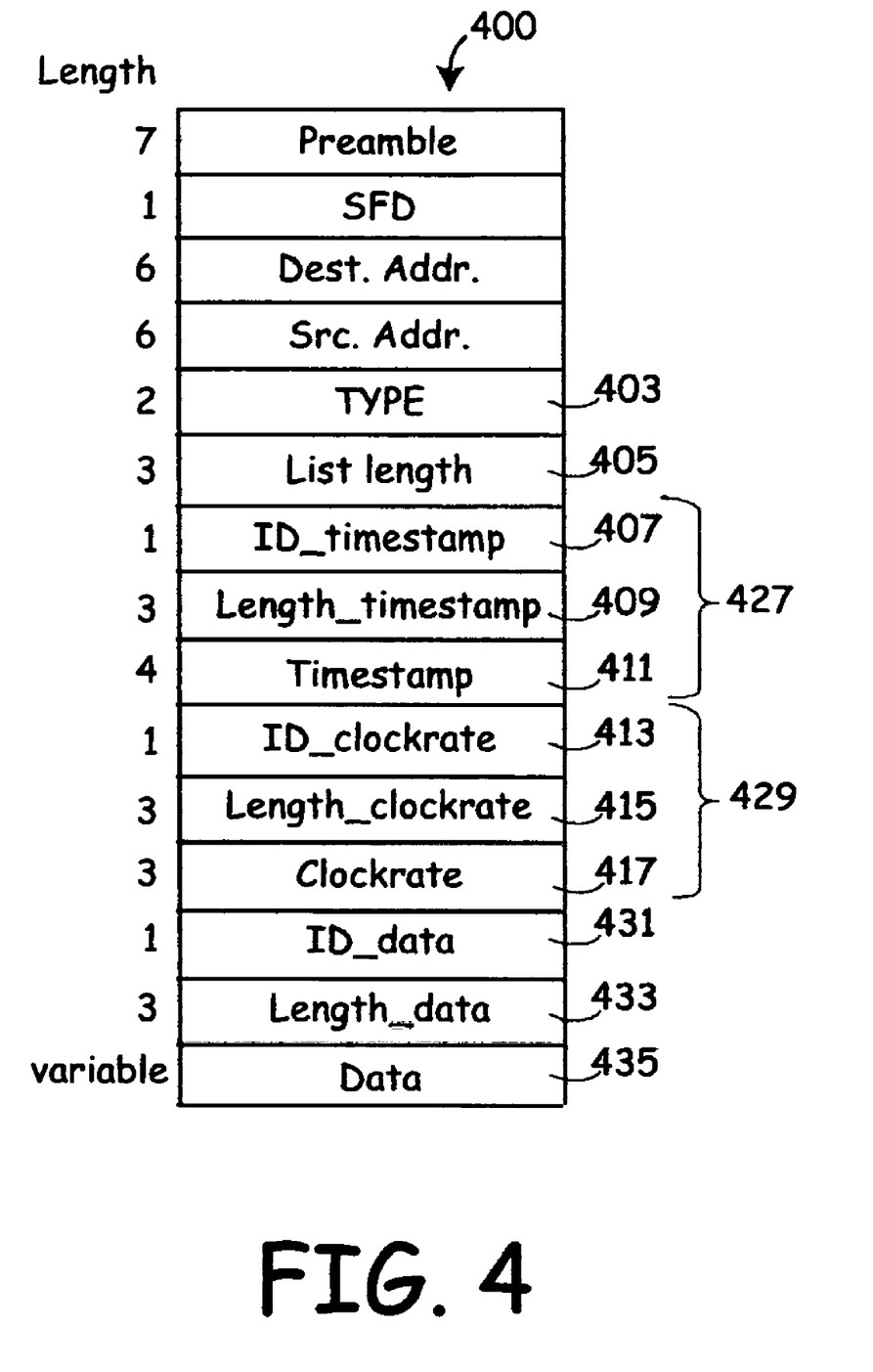
FIG. 4 that shows an Ethernet or similar packet 400 of the special kind used to transport the buffer/timestamp subsystem data according to one aspect of the invention.

Encapsulation of the data samples and timestamp—or just the timestamp in the case of a transmitting station—is now explained with the aid of FIG. 4 that shows a packet 400, e.g., an Ethernet packet of the special kind used to transport the buffer/timestamp subsystem data. The preamble, start of frame delimiter ("SFD"), destination address, and source address fields are standard. For example, the source address is of the AP that captured the data, or that transmitted the data in the case of transmitting information, and the destination address is of the WLAN manager. The next field 403 is used as a TYPE field and includes a code, denoted TYPE, for a new type. One embodiment uses two different types, one for a transmitting station and another for a receiving station. For each of these, any previously unused value that is large enough such that it defines a type, and that is not used for other purposes, may be used here.

An alternate embodiment described herein uses the same type TYPE, but the nature of the data indicates whether or not this is for a transmitting station or a receiving station.

The information is encapsulated using a standard information element list structure that starts with a List length field 405 that indicates the length of the list, and then a set of type/length/value triplets for each data element, in this case, the timestamp element, an element to indicate the clock resolution for the timestamp, and the contents of the sampling buffer.

Thus, following the List length field 405 is a triplet 427 that includes a first element carrying an identifier 407, denoted ID_timestap—a pre-defined value that identifies the element as the timestamp, then a field 409 denoted Length_timestamp indicating the length of the timestamp data. The next field 411 is the timestamp data itself.

Following the timestamp triplet 427 is a triplet 429 that identifies what the clock rate is for the timestamp data. A first element carries an identifier 413, denoted ID_clockrate_a pre-defined value that identifies the element as the clockrate, then a field 415 denoted Length_clockrate indicating the length of the clockrate data. The next field 417 is the clock rate data itself in kHz.

Following the clockrate triplet 429, is a field 431 carrying an identifier, denoted ID_data—a pre-defined value that identifies the element as the data being transferred, then a field 433 denoted Length_data indicating the length of the data. The next field 435 is the data from the buffer subsystem 233 that is being transferred.

In one embodiment, the ID_data has one value for when data is being transferred, and another pre-defined value for the case of a transmitting station indicating the timestamp value when the data is being transmitted. In the case of a transmitting station, no data is being sent, so that the Length_data is 0, and there is no field 435.

Note that the inventors decided to use packets that include a flexible information element list structure in order to provide for flexibility in how these packets are used in the future. For example, one alternate embodiment includes other data carrying such information as transmit latency or delay, receive latency or delay, and so forth.

In an alternate embodiment, simpler fixed length packets are used.

Thus, the WLAN manager receives packets from both transmitting and receiving stations participating in the round robin transmissions described above, and further processes such data to determine times of arrival, and time differences of arrival.

Determining Times of Arrival

Each recorded packet is post-processed to identify precisely when the packet arrived with respect to the start of the record. This offset, plus the timestamp, is used as the time when the packet arrived at the respective receiving station.

Now for each of these, the time of arrival of the packet is assumed known. As described above, the local clock only has ticks that provide a certain level of precision, e.g., at the ADC clock of 80 MHz to provide a tick every 12.5 ns. Furthermore, for typical 802.11b and 802.11a or 11 g, the bandwidth of the signal is less than or equal to approximately 22 MHz, so that 1/bandwidth is greater than or equal to 44 ns. To achieve TDOA accuracy of, say in the order of 5 to 10 ft, i.e., about 5-10 ns in time accuracy, requires what is known as super-resolution.

One aspect of the invention is performing super-resolution processing to achieve accuracy beyond that implied by the signal bandwidth.

As a rationale for the method described herein, consider a model of the signal received signal, denoted rx(t) as a function of time t, related to the transmitted packet denoted tx(t)

$$rx(t)=tx(t)*\text{channel\_model}(t)+\text{noise}(t) \qquad \text{Eq. 24}$$

where channel_model(t) is the model of the propagation channel, * is the convolution operation, and noise(t) is additive noise.

Suppose the transmitted signal is such that it is reasonably uncorrelated, called "mainly noise-like" herein. That is, suppose the autocorrelation of tx(t), i.e., $tx(t)*tx^c(-t)$, is close to a delta function $\delta(t)$. Superscript c denotes complex conjugation in the case of complex values, i.e., I,Q signals. Then if there was no noise, and a perfect channel, those in the art will understand that a correlation of the received signal rx(t) with the modulated packet known to have been transmitted would provide the required timing.

Figure 5:
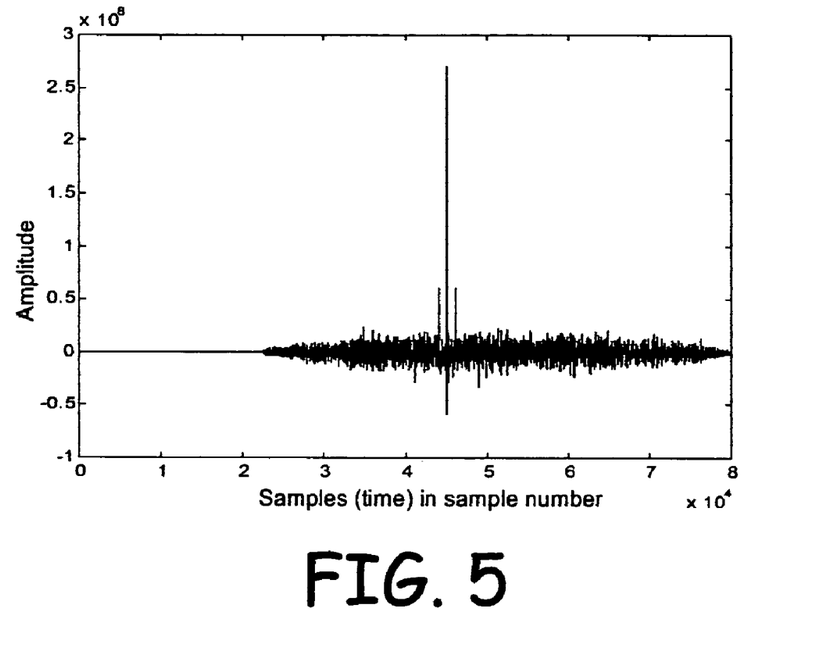
FIGS. 5 and 6 respectively show autocorrelation characteristics of packets used for TDOA determination for IEEE 802.11a,g and for 802.11b access points respectively, according to embodiments of the present invention.

By a reference signal is meant the part of the signal transmitted for TDOA determination used for determining the time of arrival. One embodiment applicable to the OFDM variants of the IEEE 802.11 standard, e.g., IEEE 802.11a or IEEE 802.11g ("802.11a,g") uses as the reference an 802.11a,g packet coded at 6 Mbps and of at least 40 ls length, and that excludes the preamble header part. FIG. 5 shows the auto-correlation of such a modulated packet, and as can be seen, the auto-correlation essentially shows a single peak, so is "noise-like," but with the two cyclic extension lobes at ±3.2 μs.

Figure 6:
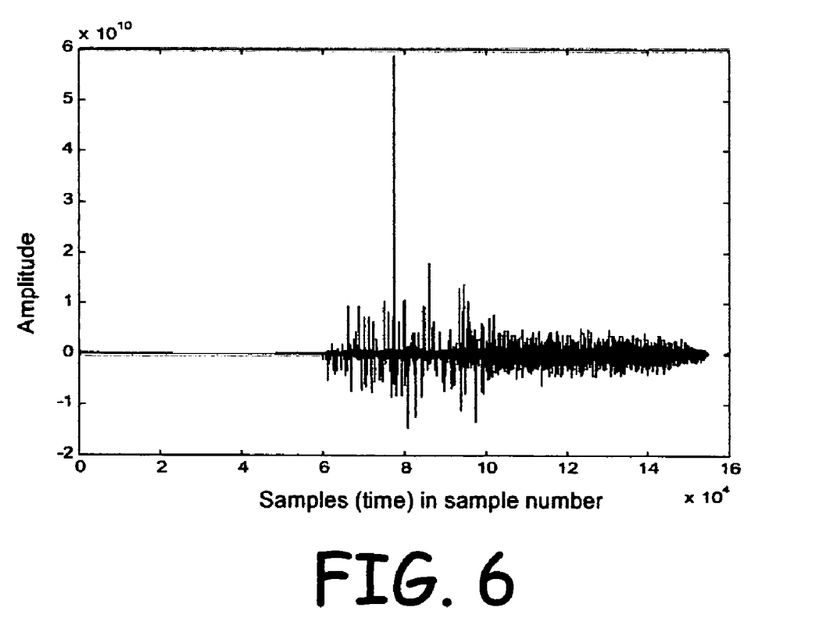

Another embodiment applicable to IEEE 802.11b uses as the reference the preamble of at least 56 μs length of an 802.11b packet. FIG. 6 shows the auto-correlation of such a preamble, and as can be seen, the auto-correlation essentially shows a single peak, so that the reference is "noise-like," but with various sidelobes and grating lobes that are at multiples of 1 μs. Note that the scales of both FIGS. 5 and 6 are relative, and the main peak should be read as the zero point.

A version of the method of determining the time of arrival from the recorded samples includes cross correlating the received signal with the appropriate reference signal, that is, determining $rx(t)*tx^c(-t)$.

A reasonable model of the channel for multipath is a sum of delayed delta-functions of different unknown amplitudes, with the first delta function being dominant, and representing the direct path between the transmitting and receiving station.

Therefore $$rx(t)=tx(t)*\Sigma_i(\alpha_i\delta(t-\tau_i))+\text{noise}(t), \qquad \text{Eq. 25}$$

where the different $\alpha_i$ and $\tau_i$ denote the different multipath complex amplitudes and time delays.

After correlation, $$rx(t)*tx^c(-t)=tx(t)*\Sigma_i(\alpha_i\delta(t-\tau_i))*tx^c(-t)+\text{noise}(t)*tx^c(-t). \qquad \text{Eq. 26}$$

The location of the first peak provides a model of the time of arrival of the packet. The inventors have found, however, that the overall effect of the multipath, together with the various sidelobes and grating, may mask the location of the first peak.

However, the inventors recognize that a deconvolution method may be applied to deconvolve the correlation sidelobes and grating lobes to remove their effect. If a model of the channel itself other than multipath also is included, a deconvolution method may also take such a model into account. After deconvolution, the location of the first peak provides a model of the time of arrival of the packet.

Thus the method includes, for each recorded packet known to have been received at a first station as a result of a transmission from a second station, post-processing the received timestamped samples to identify precisely when the packet arrived at the first station with respect to the timestamp that indicates the start of the record. In one embodiment, this includes:

Forming a set of samples of a reference signal that was sent from the second station for TDOA determination.

Correlating the reference signal with the received signal samples to obtain a correlated result.

Deconvolving the correlated result with one or both of the channel model and the sidelobes in the autocorrelation of the reference signal.

Determining the peak location, e.g., first significant peak, as an indication of the time of arrival.

Note that the order of these steps may be changed.

In one embodiment, for 802.11a,g packets, i.e., for packets that conform to one of the OFDM variants of the IEEE 802.11 standard, the reference is obtained by demodulating the received samples, decoding the packet, and re-modulating to form the "noise-like" part of the packet of a sufficient length to use as the reference, e.g., by using at least part of the payload section of the decoded packet, excluding the preamble, i.e., using the PHY Service Data. Unit (PSDU). In one embodiment, a sufficient length is 40 μs or more of the PSDU.

For 802.11b packets, in one embodiment, the samples of the preamble of an 802.11b packet of a sufficient length is used. In one embodiment, a sufficient length is 56 μs or more. In another embodiment, the reference is formed from PSDU of an 801.11b packet.

Various deconvolving methods are known, and may be used for the deconvolving step. The inventors recognized that searching for the temporal location of a peak of a set of delta functions is a one-dimensional simplification of a spatial problem of deconvolving obtained signals of a two dimensional pattern of point sources viewed by a convolving beam. Such problems are known, e.g., in the field of radioastronomy, and techniques from that field may be fruitfully modified and applied to the present deconvolution task. There has been a lot of research into deconvolution methods for that field.

One embodiment uses a maximum entropy deconvolution (MEM) method followed by a method of determining the location of the earliest peak.

Another alternate embodiment uses a maximum likelihood method that determines dominant rays in channel sounding application, again followed by a method of determining the location of the earliest peak. Searching for centroids of clusters, e.g. by searching for the cumulative absolute values.

For a description of one maximum likelihood method called space-alternating generalized expectation-maximization algorithm (SAGE), see, for example, J. Fessler and A. Hero: "Space-alternating generalized expectation-maximization algorithm", IEEE Trans. Signal Processing, vol. 42, No. 10, pp. 2664-2667, 1994.

Another maximum likelihood method that can be used is ESPRIT. For a general discussion, but not specific to solving these problems, see, for example, M. Tschudin, C. Brunner, T.P. Kurpjuhn, M. Haardt, and J. A. Nossek. Comparison between Unitary ESPRIT and SAGE for 3-D channel sounding. In Proc. 49th IEEE Vehicular Technology Conf. Spring (VTC '99 Spring), volume 2, pages 1324-1329, Houston, Tex., May 1999. See also Peangduen Satayarak, Panarat Rawiwan, Pichaya Supanakoon, Monchai Chamchoy, Sathaporn Promwong and Prakit Tangtisanon, "The Achievable Performance of Unitary-ESPRIT Algorithm for DOA Estimation," Proceedings, 2002 International Conference on Circuits/Systems Computers and Communications (ITC-CSCC 2002), Phuket, Thailand 2002.

When either SAGE or ESPRIT is used, it is followed by a method of determining the location of the first peak of energy.

For a review of deconvolution methods, see the tutorial Tim Cornwell and Alan Bridle: "Deconvolution Tutorial" by the National Radio Astronomy Observatory (Charlottsville, Virginia). The tutorial is widely distributed, and available online at http://www.cv.nrao.edu/~abridle/deconvol/deconvol.html. The 1996 version of the tutorial is incorporated herein by reference.

The preferred embodiment of the invention uses the CLEAN method first introduced for the astronomy application by Högbom. See Högbom J. (1974), "Aperture synthesis with a non-regular distribution of interferometer baselines", *Astrophys. J SuppL Ser.*, 15, 417-426. See also the above-mentioned "Deconvolution Tutorial" and see Eric Weisstein: "CLEAN Algorithm—from Eric Weisstein's World of Physics" available online at http://scienceworld.wolfram.com/physics/CLEANAlgorithm.html. The Weisstein article is incorporated herein by reference.

The original version of CLEAN assumes one is estimating a small number of point sources in an otherwise empty field of view. The method uses an iterative procedure to find the positions and strengths of these sources. The final deconvolved "CLEAN" image is the sum of these point-source "CLEAN components" reconvolved ("restored") with a "CLEAN beam" (usually Gaussian in the original astronomy application) to de-emphasize the higher spatial frequencies which are often spuriously extrapolated, (optionally, but recommended) with a map representing residual differences between the point-source model and the data.

One embodiment includes an iterative algorithm in which CLEAN deconvolves a sampling function, called the "Dirty Beam" in CLEAN terminology, and that in the present invention is the calculated autocorrelation of the reference signal, denoted Dirty_beam(t) herein, from measured values, called the "dirty map" in CLEAN terminology, and denoted Measured(t) herein.

The basic CLEAN method was originally designed for point sources, but it has been found to work well for extended sources as well when given a reasonable starting model. The CLEAN method constructs discrete approximations to the CLEAN map in the plane (in the present application, the time domain) from the convolution equation.

$$\text{Dirty\_map}(t) = \text{Dirty\_beam}(t) * \text{Clean\_map}(t) \qquad \text{Eq. 27}$$

Note, how to implement the CLEAN algorithm is well known, and further, sample software for the two-dimensional CLEAN algorithm is widely available. The Astronomical Image Processing Software (AIPS) of the National Radio Astronomical Observatory (Charlottsville, VA) includes various two-dimensional deconvolution methods in the tasks called DCONV and UVMAP. How to modify these for one-dimensional applications would be straightforward to those in the art.

In one embodiment, the CLEAN algorithm proceeds as follows:

(a) Find the strength and position (in time) of the peak in the dirty map.

(b) Subtract from the dirty map, at the location of the peak, the dirty beam multiplied by the strength of the found peak and multiplied by a dampling factor called the "loop gain" or "CLEAN_gain." In one embodiment, a loop gain of 0.1 is used.

(c) Go to A., unless there is a peak below a user-specified level. In the present embodiment, the search for the peak is restricted to a window, called the "CLEAN window" in the traditional CLEAN method.

(d) Convolve the model of the main peak with an idealized "CLEAN" beam. In one embodiment, the idealized clean beam is a beam of approximately the same width as the dirty beam, but with no sidelobes or grating lobes.

(e) Add the residuals of the dirty image to the CLEAN image.

Many variants of the basic CLEAN methods are known, and different embodiments of the invention may use other variants.

Thus methods and apparatuses have been described that use TDOA for radiolocation.

Note that while the above has included each transmitting station recording and sending a timestamp of transmission.

In an alternate embodiment, the WLAN manager requests each transmitting station to transmit at some a-priori known time.

One embodiment of each of the methods described herein is in the form of a computer program that executes on a processing system, e.g., one or more processors that are part of the WLAN manager 103. Thus, as will be appreciated by those skilled in the art, embodiments of the present invention may be embodied as a method, an apparatus such as a special purpose apparatus, an apparatus such as a data processing system, or a carrier medium, e.g., a computer program product. The carrier medium carries one or more computer readable code segments for controlling a processing system to implement a method. Accordingly, aspects of the present invention may take the form of a method, an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments embodied in the medium. Any suitable computer readable medium may be used including a magnetic storage device such as a diskette or a hard disk, or an optical storage device such as a CD-ROM.

It will be understood that the steps of the methods discussed are performed in one embodiment by an appropriate processor (or processors) of a processing (i.e., computer) system executing instructions (code segments) stored in storage. It will also be understood that the invention is not limited to any particular implementation or programming technique and that the invention may be implemented using any appropriate techniques for implementing the functionality described herein. The invention is not limited to any particular programming language or operating system.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should be appreciated that although the invention has been described in the context of the IEEE 802.11 standard, the invention is not limited to such contexts and may be utilized in various wireless network applications and systems, for example in a network that conforms to a standard other than IEEE 802.11. Furthermore, the invention is not limited to any one type of architecture or protocol, and thus, may be utilized in conjunction with one or a combination of other architectures/protocols. For example, the invention may be embodied in wireless networks conforming to other standards and for other applications, including other WLAN standards, bluetooth, GSM, PHS, CDMA, and other cellular wireless telephony? standards.

All publications, patents, and patent applications cited herein are hereby incorporated by reference.

Thus, while there has been described what is believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:

1. A radiolocation method in a wireless network comprising:
   determining the relative locations of a set of wireless stations of the wireless network, each station including a local clock, each station further including a transmitter, a receiver, an analog-to-digital converter to form samples of received signals, and a buffer subsystem coupled to the analog-to-digital converter, said determining the relative locations including:
      each of the set of stations at least once transmitting a radio signal corresponding to a packet to be received by each other station, the transmitting in a round robin manner one station after the other;
      each of the stations receiving the packets transmitted by each of the other stations; and
      at each receiving station,
         sampling the received signal corresponding to a received packet at a rate according to an ADC clock;
         capturing samples in a memory;
         timestamping the captured samples according to a local timestamping clock related to the station's local clock; and
         sending the timestamped captured samples to a processing entity,
   such that the processing entity can determine the times of arrival of each packet at each station, and from the determined times of arrival, mutually calibrate the stations' local clocks, and further determine the relative positions of the stations by determining the time-of-flight between the stations of the radio signals corresponding to the transmitted packets.

2. A method as recited in claim 1, wherein mutually calibrating the stations' local clocks determines the relationship of each station's local clock to a global time measure.

3. A method as recited in claim 1, wherein each of the transmitting stations further sends to the processing entity a transmit timestamp indicating the time of transmitting, according to its local timestamping clock related to the station's local clock.

4. A method as recited in claim 3, wherein the number of round robin transmissions is sufficient to mutually calibrate the stations' local timestamping clocks under the assumption that any drift in the timestamping clock of each station depends on one or more unknown parameters.

5. A method as recited in claim 4, wherein the determining at the processing entity includes:
   assuming a relationship between the local time and a global time common to the stations of the set, the relationship defined by the sets of one or more parameters, and determining the sets of parameters from the local times of arrival of the received packets.

6. A method as recited in claim 3, wherein each receiving station's ADC clock is related to the station's local clock, such that the timestamping clock is related to the ADC clock.

7. A method as recited in claim 6, wherein the wireless network conforms to at least one variation of the IEEE 802.11 standard, and wherein the stations are access points (APs) coupled to the processing entity.

8. A method as recited in claim 7, wherein the processing entity is one of the APs.

9. A method as recited in claim 7, wherein the processing entity is a device coupled by a network to each of the APs.

10. A method as recited in claim 9, wherein the sending the timestamped captured samples uses one or more Ethernet packets.

11. A method as recited in claim 6, further comprising:
determining the location of an additional station, including:
at least some of the stations receiving a packet transmitted by the additional station; and
at each receiving station,
sampling the received signal corresponding to a received packet at a rate according to the station's ADC clock related to the local clock;
capturing samples in the memory;
timestamping the captured samples according to the station's local clock related to the ADC clock; and
sending the timestamped captured samples to a processing entity;
such that the processing entity can determine the times of arrival of the packet at each receiving station, and from the determined times of arrival and the relationship between each receiving station's local clock, determine the relative positions of the additional station.

12. A radiolocation method in a wireless network comprising:
receiving transmit timestamps from a set of wireless stations of the wireless network, each station transmitting a radio signal at least once, each station including a local clock, a transmitter, a receiver, and a local timestamping clock related to the station's local clock, each transmit timestamp using the local timestamping clock and corresponding to when each of the set of stations transmitted a packet to be received by each other station;
receiving sets of timestamped captured samples sent from each station that receives one of the transmitted packets, each receiving station further including an analog-to-digital converter to form samples of received signals, and a memory coupled to the analog-to-digital converter, each receiving station sampling the received signal corresponding to a received packet at a rate according to an ADC clock, capturing samples in the memory, and timestamping the captured samples according to a local timestamping clock related to the station's local clock, and sending a set of timestamped captured samples;
from the received sets of timestamped captured samples, determining the times of arrival of each packet at each station; and
from the determined times of arrival and the received transmit timestamps, determining the relative positions of the stations by determining the time-of-flight between the stations of the radio signals corresponding to the transmitted packets.

13. A method as recited in claim 12, wherein the transmitting by the stations is in a round robin manner one station after the other, and wherein the number of round robin transmissions is sufficient to mutually calibrate the stations' local timestamping clocks under the assumption that any drift in the timestamping clock of each station depends on one or more unknown parameters.

14. A method as recited in claim 12, wherein determining the times of arrival of each packet includes for each set of captured samples:

forming a set of samples of a reference signal that corresponds to at least part of the packet that was sent to the station; and
correlating the reference signal samples with the captured samples to obtain a correlated result.

15. A method as recited in claim 14, wherein determining the times of arrival of each packet at each station further includes:
deconvolving the correlated result with one or both of a model of the propagation channel and a measure of the autocorrelation of the reference signal, the deconvolving being at least around the expected location in time of the first peak of the results of correlating; and
determining the location of the first peak of the results of the deconvolving as an indication of the time of arrival.

16. A method as recited in claim 14, wherein the channel model is a set of impulses of different amplitudes, being a model of multipath.

17. A method as recited in claim 14, wherein the deconvolving uses the method known as CLEAN or a variant thereof.

18. A method as recited in claim 14, wherein the deconvolving uses maximum entropy method (MEM) or a variant thereof.

19. A method as recited in claim 14, wherein the deconvolving uses a maximum likelihood method.

20. A method as recited in claim 14, wherein the packet that was sent to the station conforms to one of the OFDM variants of the IEEE 802.11 standard, and wherein forming a set of samples of the reference signal includes demodulating and decoding the captured samples, and re-modulating the decoded samples to form the set of samples of the reference signal from at least part of the payload section of the decoded packet.

21. A method as recited in claim 14, wherein the packet that was sent to the station conforms the IEEE 802.11b standard, and wherein forming a set of samples of the reference signal uses the preamble part of an IEEE 802.11b packet.

22. A method comprising:
receiving transmit timestamps from a set of wireless stations of a wireless network, each station transmitting at least once, each transmit timestamp using a local timestamping clock to indicate when the stations transmitted a packet;
receiving sets of timestamped captured samples from each station that receives one of the transmitted packets, each set of timestamped captured samples being of a signal received at the respective station;
from the received sets of timestamped captured samples, determining the times of arrival of each packet at each station; and
from the determined times of arrival and the received transmit timestamps, determining the relative positions of the stations,
wherein the transmitting by the stations is in a round robin manner one station after the other, and wherein the number of round robin transmissions is sufficient to mutually calibrate the stations' local timestamping clocks under the assumption that any drift in the timestamping clock of each station depends on one or more unknown parameters.

23. A method comprising:
receiving transmit timestamps from a set of wireless stations of a wireless network, each station transmitting at least once, each transmit timestamp using a local timestamping clock to indicate when the stations transmitted a packet;

receiving sets of timestamped captured samples from each station that receives one of the transmitted packets, each set of timestamped captured samples being of a signal received at the respective station;

from the received sets of timestamped captured samples, determining the times of arrival of each packet at each station; and from the determined times of arrival and the received transmit timestamps, determining the relative positions of the stations, wherein determining the times of arrival of each packet includes for each set of captured samples:

correlating the captured samples with a reference signal to obtain a correlated result, the reference signal corresponding to at least part of the signal that was transmitted;

correlating the reference signal samples with the captured samples to obtain a correlated result;

deconvolving the correlated result; and determining the location of the first peak of the results of the deconvolving as an indication of the time of arrival.

24. A method as recited in claim 23, wherein the deconvolving uses the method known as CLEAN or a variant thereof.

25. A computer-readable carrier medium carrying one or more code segments to instruct a processor of a processing system to implement a method, the method comprising:

receiving transmit timestamps from a set of wireless stations of a wireless network, each station transmitting at least once, each transmit timestamp using a local timestamping clock to indicate when the stations transmitted a packet;

receiving sets of timestamped captured samples from each station that receives one of the transmitted packets, each set of timestamped captured samples being of a signal received at the respective station;

from the received sets of timestamped captured samples, determining the times of arrival of each packet at each station; and from the determined times of arrival and the received transmit timestamps, determining the relative positions of the stations, wherein determining the times of arrival includes for each set of captured samples:

correlating the captured samples with a reference signal to obtain a correlated result, the reference signal corresponding to at least part of the signal that was transmitted;

correlating the reference signal samples with the captured samples to obtain a correlated result;

deconvolving the correlated result; and determining the location of the first peak of the results of the deconvolving as an indication of the time of arrival.

26. A carrier medium as recited in claim 25, wherein the deconvolving uses the method known as CLEAN or a variant thereof.

27. An apparatus comprising:

means for receiving transmit timestamps from a set of wireless stations of a wireless network, each station transmitting at least once, each transmit timestamp using a local timestamping clock to indicate when the stations transmitted a packet;

means for receiving sets of timestamped captured samples from each station that receives one of the transmitted packets, each set of timestamped captured samples being of a signal received at the respective station;

means for determining the times of arrival of each packet at each station from the received sets of timestamped captured samples; and means for determining the relative positions of the stations from the determined times of arrival and the received transmit timestamps, wherein the means for determining the times of arrival includes:

means for correlating the captured samples with a reference signal to obtain a correlated result, the reference signal corresponding to at least part of the signal that was transmitted;

means for deconvolving the correlated result; and means determining the location of the first peak of the results of the deconvolving as an indication of the time of arrival.

28. A carrier medium as recited in claim 27, wherein the deconvolving uses the method known as CLEAN or a variant thereof.

29. An apparatus in a station of a wireless network, the apparatus including:

a local clock;

a transmitter;

a receiver;

an analog-to-digital converter to form samples of received signals, the sampling at a rate according to an ADC clock related to the local clock;

a buffer subsystem coupled to the analog-to-digital converter;

a timestamping clock coupled to the local clock; and a trigger circuit coupled to the buffer subsystem, to the timestamping clock, and to the transmitter to indicate when the station transmits a packet such that the station can send a transmit timestamp to a processing entity, the transmit timestamp indicating when the packet was transmitted, the trigger circuit also coupled to the receiver such that the station is able to capturing samples of a received signal in the buffer subsystem, timestamp the captured samples; and send the timestamped captured samples to the processing entity, such that the processing entity can determine the times of arrival of each packet at each station, and from the determined times of arrival, further determine the relative positions of the stations by determining the time-of-flight between the stations of radio signals corresponding to the transmitted packets.

30. An apparatus as recited in claim 29, wherein the ADC clock is related to the local clock, such that the timestamping clock is related to the ADC clock.

31. An apparatus as recited in claim 30, wherein the ADC clock runs at an integer multiple of the frequency of the timestamping clock, said integer being at least one.

32. An apparatus as recited in claim 30, wherein the wireless network conforms to at least one variation of the IEEE 802.11 standard, and wherein the station is an access point (AP) coupled to the processing entity.

33. An apparatus as recited in claim 32, wherein the processing entity is a device coupled by a network to the AP.

34. An apparatus as recited in claim 29, wherein the sending to the processing entity uses Ethernet packets.

* * * * *